United States Patent [19]

Cary et al.

[11] 4,061,094

[45] Dec. 6, 1977

[54] MAGNETIC SEED DELIVERY AUTODIBBLE PLANTER

[75] Inventors: John W. Cary; William H. Heinemann, Jr., both of Kimberly, Idaho

[73] Assignee: The United States of America as represented by the Secretary of Agriculture, Washington, D.C.

[21] Appl. No.: 715,676

[22] Filed: Aug. 19, 1976

[51] Int. Cl.$^2$ .............................................. A01C 5/04
[52] U.S. Cl. ........................................ 111/89; 111/77; 221/212
[58] Field of Search ................................. 111/89–91, 111/77; 221/212

[56] References Cited

U.S. PATENT DOCUMENTS

| 1,389,363 | 8/1921 | Karpenko | 111/89 |
| 2,543,888 | 3/1951 | Bunch | 111/91 |
| 2,675,942 | 4/1954 | Vogelsang | 221/212 |
| 3,982,661 | 9/1976 | Feltrop | 111/77 X |

FOREIGN PATENT DOCUMENTS

| 33,934 | 12/1885 | Germany | 111/89 |
| 7,912 of | 1914 | United Kingdom | 111/89 |
| 264,031 | 2/1970 | U.S.S.R. | 111/77 |

Primary Examiner—Clifford D. Crowder
Assistant Examiner—Steven A. Bratlie
Attorney, Agent, or Firm—M. Howard Silverstein; David G. McConnell; Theodore J. Leitereg

[57] ABSTRACT

Apparatus for punch planting of seeds comprising a slotted-rimmed wheel rotatably mounted on a frame with an axis of rotation passing through the center of a gear fixed to the frame. The wheel is equipped with a plurality of drive gears which communicate with and rotate around the fixed gear. On each drive gear is pivotally mounted a magnetic-tipped punch. The rotation of the wheel causes the punches to move in and out of the slots in the wheel. The action of the punch produces a small hole in the soil and embeds a coated seed therein.

4 Claims, 3 Drawing Figures

4,061,094

MAGNETIC SEED DELIVERY AUTODIBBLE PLANTER

BACKGROUND OF THE INVENTION

1. Field of the Invention:

This invention relates to and has among its objects the provision of novel apparatus for planting seeds. Further objects of the invention will be evident from the following description.

2. Description of the Prior Art:

The general method of planting seeds involves digging a furrow or large hole in the soil, placing the seeds in the opening, and covering the seeds with soil. Oftentimes, however, seedlings fail to emerge because of premature soil drying, accumulation of salts in the shallow seedbeds, or inability to break through even weak soil crusts. To insure adequate stands of certain crops, therefore, excess seed is planted. One problem is that the crop which results must be thinned, a time-consuming and expensive operation.

A solution to the above problem involves dropping a seed into a small hole and leaving the seed uncovered. This process is known as the punch (or dibble) planting method and allows precision planting of crops. The air in the small hole, which contains the seed, remains reasonably stable and the soil does not dry out. This results because of the natural soil temperature gradients occurring during the day. The seed germinates and sends its growing tip to the surface without resistance from soil particles. Also, seeds may be planted at a deeper level in the punch method. This places the seeds below the zone of high salt accumulation at the surface. Further, the depth of the seed within the hole is at a level where moisture conditions remain optimum for seed germination for a longer period.

Experimental machines for punch planting are described in *Transactions of the ASAE*, Vol. 16, No. 4, pp 656–659 (1973). Two types of machines are discussed--a pneumatic punch planter and a belt-type punch planter. Neither machine has advanced beyond the experimental stage to commercial use because of certain inherent defects. In the pneumatic planter forward speeds are too slow for practical operation. The pneumatic planting machine can operate at a maximum speed of one mph., whereas efficient planting requires a speed of at least three mph. If the pneumatic planting device is operated at speeds greater than one mph., the hole is misformed and seeds are scattered. The belt-type planter is ineffective because of belt slippage with respect to the soil surface, which causes the seeds to be misplaced.

SUMMARY OF THE INVENTION

The invention described herein provides means and apparatus for obviating the above problems. The apparatus of the invention allows automated dibble planting with utmost precision suitable for practical commercial use.

In the apparatus of the invention a non-rotating gear is fixed to a frame. A slotted-rimmed wheel with an axis of rotation through the center of the fixed gear is rotatably mounted on the frame. The wheel is equipped with a plurality of smaller rotating (or drive) gears which are planetarily arranged around and communicate with the fixed gear. Each rotating gear is equipped with a punch containing a magnetic tip. As the wheel rotates the drive gears also rotate around the fixed gear. The rotation of the drive gears drives the pivotally mounted punches in and out of the wheel through the slots therein. A seed box is furnished containing seeds coated with a magnetic attracting substance. As the wheel rotates one of the retracted punches passes the seed box whereupon one or more seeds is attached to the tip of the magnetic punch. All but one of the seeds are removed from the tip as it passes out of the seed box. The punch containing the seed travels circularly until near the soil. The punch then drives a hole into the soil, imbeds the seed therein, and withdraws, leaving a small hole with a seed at the bottom.

One of the advantages of the apparatus of the invention is that precise planting is realized. The seeds within each row may be evenly spaced at a distance which will ensure optimum stands of the crop. Further, thinning of the crop is unnecessary; thus, savings of time and labor costs may be realized.

Another advantage of the apparatus of the invention is that an individual seed is firmly placed at the bottom of a small hole. This results because the seed is placed on the tip of the punch and is driven into the soil with the full force of the punch.

A further advantage of the apparatus of the invention is that efficient planting speeds are possible. The instant apparatus is capable of precision planting at speeds of three mph. or more.

DESCRIPTION OF THE PREFERRED EMBODIMENTS

The apparatus of the invention is next described in detail with reference to the attached drawings.

Figure 1:
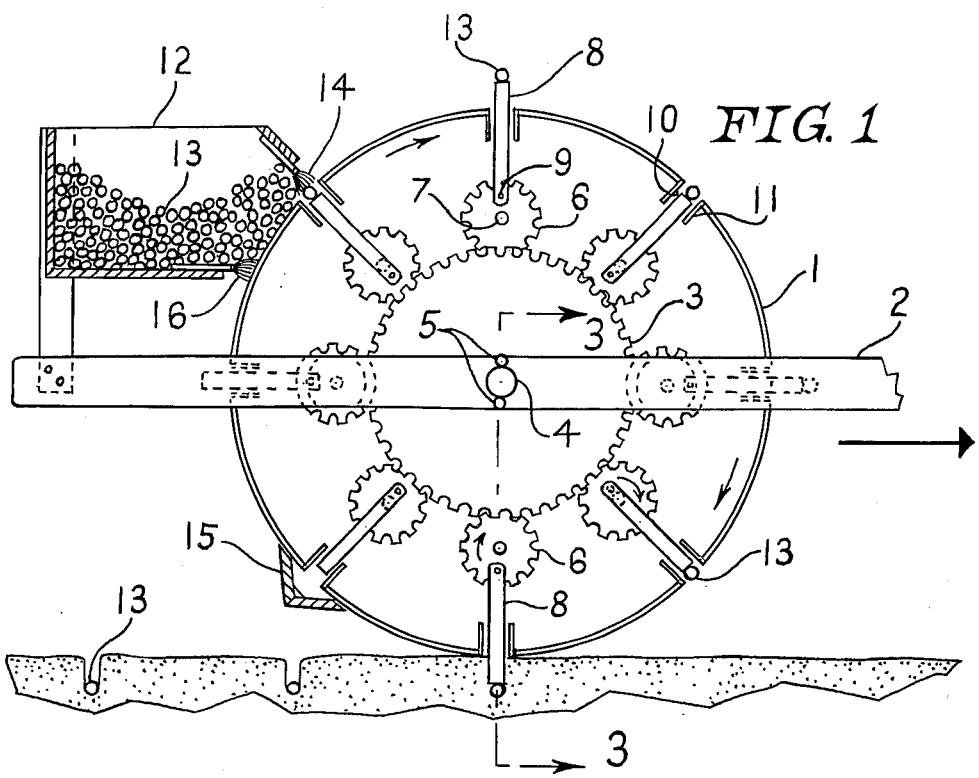
FIG. 1 is a side view of the apparatus of the invention.

Referring to FIG. 1, wheel 1 is rotatably mounted on frame 2 with an axis of rotation passing through the center of gear 3, which is fixed to frame 2. Wheel 1 is attached to the frame at point 4 and gear 3 is attached to the frame at point 5. Wheel 1 is equipped with a plurality of drive gears 6 rotatably mounted on wheel 1 at points 7. To each rotating gear is attached a punch 8 at pivot point 9. Pivot points 9 are each equipped with bushings to facilitate pivoting of the punches as gears 6 rotate. Rotating gears 6 are planetarily arranged around and communicate with fixed gear 3.

As wheel 1 is rotated, as, for example, along a tilled bed of soil, drive gears 6 also rotate about fixed gear 3. Rotation of 6 causes punches 8 to move in and out of wheel 1 through slots 10 in the rim of the wheel with bushings 11 allowing the punches to pivot as they enter and exit slots 10. The distance between the perimeter (or rim) of the wheel and point 4, the circumference of fixed gear 3, and the circumference of wheel 1 are coordinated such that punches 8 are always perpendicular to the soil surface as they enter and retract from the soil. It should be emphasized that such an arrangement is necessary to prevent the removal of the seed from the tip of the punch prior to its embedment in the soil. In the particular embodiment illustrated in FIG. 1 punches 8 are fully extended when they are perpendicular to and parallel to the soil surface and fully retracted when they are at points midway between perpendicular and parallel.

Seed box 12 is positioned at some point when punch 8 is almost fully retracted. Box 12 is filled with seeds 13 equipped with means for attachment to the tip of punches 8, such as being coated with some magnetic attracting substance. For example, the seeds can be coated with clay containing iron filings. Other appropriate coatings for the seeds will be obvious to those skilled in the art. Punches 8 are equipped with means for attaching a seed thereto, such as a magnetic tip. As one of the punches passes the seed box, a seed is attached to its tip and is withdrawn with the punch into the wheel. The distance between the tip of the punch and the outer circumference of the wheel at the point when the punch is fully retracted is approximately the diameter of a single seed. Thus, as the wheel rotates and punch 8 has picked up a seed, brush 14 can remove any excess seeds, thereby insuring that each punch contains no more than one seed as it leaves seed box 12. The individual seeds are carried around the wheel and driven into the soil by the motion of punches 8.

The force of the punch must be such as to firmly embed the seed in the soil and thereby overcome the magnetic attractive forces between the seed and the tip of the punch. The soil conditions must be such that the force of the punch does not cause damage to the seed. Generally, the soil should be moist and tilled prior to use of the apparatus of the invention. Those skilled in the art will be able to determine easily the necessary conditions. The depth of the hole depends on the nature of the soil conditions, the type of seed planted, and the like.

Figure 2:
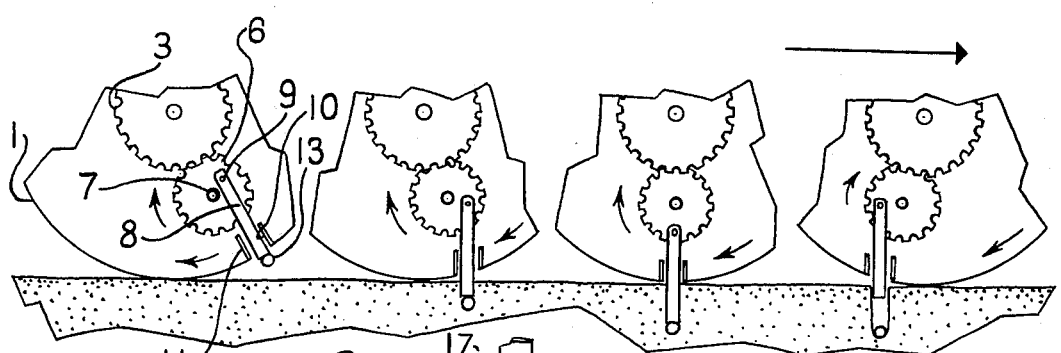
FIG. 2 depicts the apparatus of the invention as it sequentially punches a hole in the soil and deposits a seed therein.

FIG. 2 depicts sequentially the action of punch 8 as it drives seed 13 into the soil. In the first diagram the punch, guided by bushing 11, is exiting wheel 1 and is about to enter the soil. In the second, the punch has begun its entrance into the soil. In the third diagram the punch is fully extended, being at a point perpendicular to the soil. In the fourth diagram the punch is retracting, leaving a hole with seed 13 at the bottom thereof. As the punch is driven downward into the soil it packs a thin layer of soil around the seed. Thus, when the punch is retracted, the seed remains firmly set in the soil.

Referring again to FIG. 1, after punch 8 has deposited the seed in the soil, it moves toward seed box 12. Knife 15 is provided to clean soil and other debris from the end of the punch. Prior to its passage through seed box 12, the punch is further cleaned by brush 16.

Figure 3:
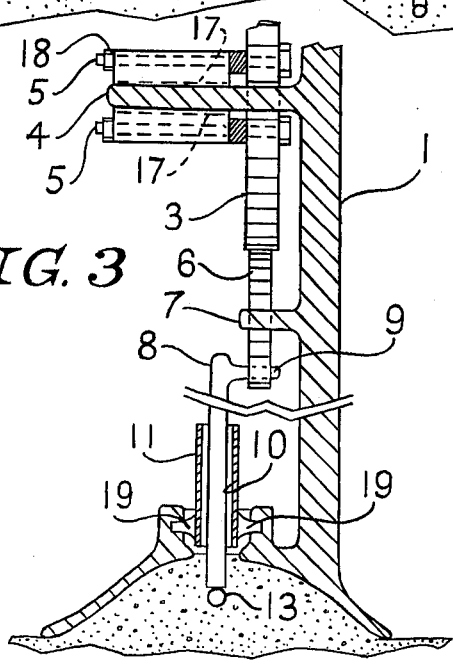
FIG. 3 is a front, cross-sectional view of the same apparatus.

A front view of wheel 1 is depicted in FIG. 3. It is preferred that the rim of wheel 1 be concave, with slot 10 and bushing 11 located at the deepest point therein. The concave wheel will form a convex seed row, which reduces the amount of soil that gets washed into the holes in the event of a hard rain storm. Point 4, the point of attachment of wheel 1, takes the form of a shaft containing bearings 17 which facilitate rotation of wheel 1 within the frame. The shaft and bearings also pass through fixed gear 3, which is mounted on frame 2 by means of bolts 5 and nuts 18.

Drive gear 6 is rotatably mounted on wheel 1 at point 7. Punch 8 is shown at a point perpendicular to the soil surface; the punch is thrust to its fullest extent into the soil. Punch 8 is mounted on gear 6 at position 9. Slot 10 is equipped with bushing 11 which pivots at points 19, thus allowing facile passage of 8 through slots 10 as gear 6 rotates.

It is within the compass of the invention to use any number of drive gears or punches that may be necessary in a particular situation. The number of slots in the rim of wheel 1 should be equivalent to the number of drive gears (or punches).

It should be obvious that the apparatus of the invention is designed for attachment to a tractor or other means for obtaining its forward motion.

Having thus described our invention, we claim:

1. A device for planting seeds, comprising in combination -
   a. a frame,
   b. a fixed gear mounted on said frame,
   c. a wheel with a concave rim rotatably mounted on said gear and having an axis of rotation passing through the center of said fixed gear, the rim of said wheel containing a plurality of slots located at the deepest point therein,
   d. a plurality of drive gears rotatably mounted on said wheel and planetarily arranged around and communicating with said fixed gear, each drive gear equipped with a punch pivotally mounted thereon and cooperating with said wheel and said fixed gear such that the rotation of said wheel causes the punches to move in and out of the wheel through the slots therein and such that the punches are fully extended when they are perpendicular to and when they are parallel to the soil surface and fully retracted when they are at points midway between perpendicular and parallel, each of said punches containing a magnetic tip, and
   e. a seed box, filled with seeds coated with a magnetic attracting substance, mounted on said frame at a position which allows distribution of the seeds to said punches.

2. The device of claim 1 wherein the distance between the perimeter of said wheel and the axis of rotation thereof, the circumference of said fixed gear, and the circumference of said wheel are coordinated such that punches are always perpendicular to the soil surface as they enter and retract from the soil.

3. The device of claim 1 wherein the number of said drive gears is determined by the desired plant spacing.

4. The device of claim 1 wherein the number of slots in the rim of said wheel is equivalent to the number of punches on said drive gears.

* * * * *